Sept. 30, 1969  J. PIGNONE  3,469,917
FILM CARRIER

Filed Dec. 28, 1967  4 Sheets-Sheet 2

INVENTOR
JOSEPH PIGNONE

BY *Darby & Darby*

ATTORNEYS

Sept. 30, 1969  J. PIGNONE  3,469,917
FILM CARRIER
Filed Dec. 28, 1967  4 Sheets-Sheet 3
FIG. 4
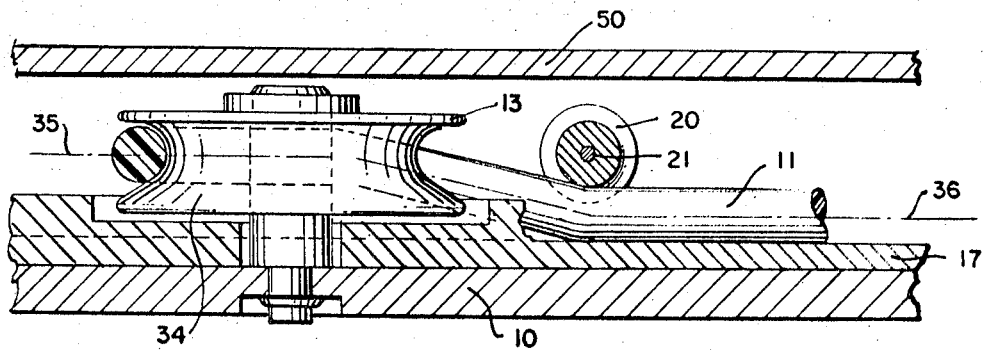
FIG. 5
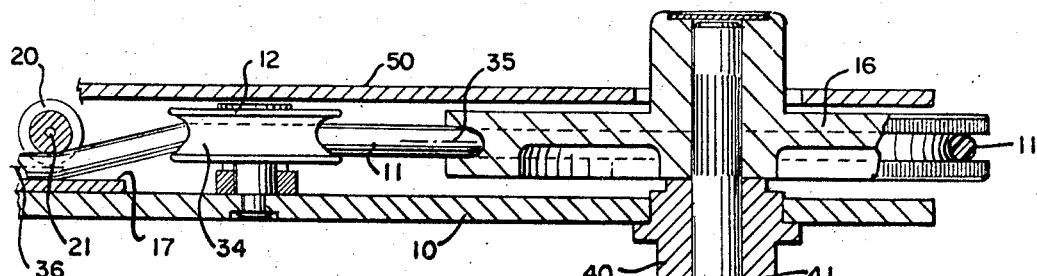
FIG. 6
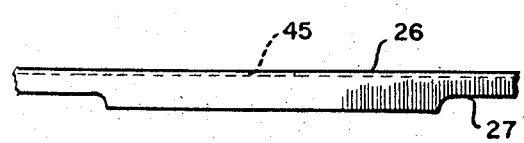
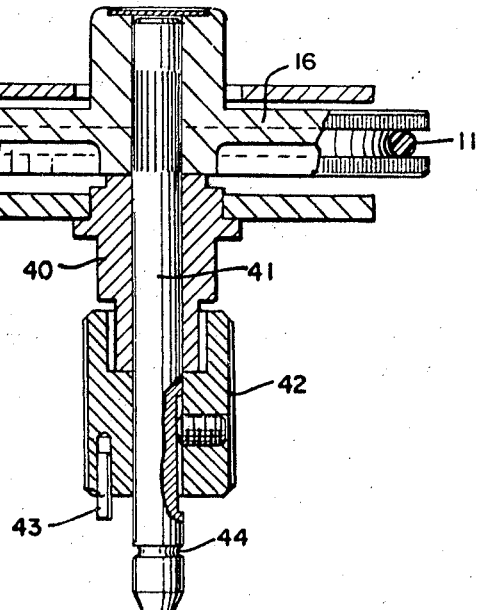
INVENTOR
JOSEPH PIGNONE
BY *Lady & Lady*
ATTORNEYS Sept. 30, 1969  J. PIGNONE  3,469,917
FILM CARRIER
Filed Dec. 28, 1967  4 Sheets-Sheet 4

INVENTOR
JOSEPH PIGNONE

BY

ATTORNEYS

United States Patent Office 3,469,917
Patented Sept. 30, 1969

3,469,917
FILM CARRIER
Joseph Pignone, Essex County, N.J., assignor to Charles Beseler Company, East Orange, N.J., a partnership
Continuation-in-part of application Ser. No. 659,474, Aug. 9, 1967. This application Dec. 28, 1967, Ser. No. 694,290
Int. Cl. G03b 27/58, 27/04, 27/10
U.S. Cl. 355—72                                                  12 Claims

ABSTRACT OF THE DISCLOSURE

A film carrier for use in photographic or projection apparatus in which a film supported on a pair of aligning film guides is transported by means of an endless belt providing a long, point to point frictional driving contact with the film, the belt being arranged such that a portion of the belt at each end of the film guides slopes away from the film guides to provide a funneling entrance to facilitate insertion of the film at either end of the carrier. The aligned film guides cooperate with the belt on one side of the film and with a third guiding member on the other to flatten the film, overcoming its tendency to bow out of the plane of projection. The film carrier also incorporates a movable aperture masking plate for changing the area of the film which is projected, and contains a window designed to permit the projection of a fiducial mark or frame number for identification of particular film frames.

---

This is a continuation-in-part application of application Ser. No. 659,474, filed Aug. 9, 1967.

This invention relates to film positioning apparatus as used generally with optical projectors and more particularly with photographic enlargers.

In optical projection systems the film being projected must be accurately positioned relative to the lens (i.e., in the object plane) and should be confined to and held flat within this plane. This is particularly true in projection systems of photographic enlargers, since any portion of the film which does not lie in the object plane will, in effect, be out of focus. For this reason, in some film carriers the film is sandwiched between glass plates, but this is undesirable because these plates become dirty, can scratch the film, and also become hot, so that the film can be damaged. Furthermore, the attempts to precisely position the film between glass plates is difficult, and in such carriers once the carrier has been inserted in the enlarger, the film cannot be positioned laterally without disturbing the components of the enlarger and opening the carrier.

Another requirement for film carriers is that the film be capable of being introduced into the enlarger or photographic apparatus with a minimum of handling, and once placed in the enlarger should be capable of being positioned relative to the lens in a convenient and precise manner. This becomes particularly important with roll film which contains many frames, any one of which might be selected for projection. It is highly desirable that a particular frame be capable of being moved into projection position without removing the carrier from the enlarger and with a minimum of manipulation of the enlarger components. Furthermore, in the case of 35 mm. film, these are frequently cut into short strips, the ends of which become inaccessible when the center frames are placed in the projection position, and so it is necessary to remove the carrier from the enlarger in order to shift the film. This is undesirable. This difficulty is further compounded in the case of individual frames.

Also in many enlargers the gap into which the film carrier is placed is usually limited in thickness. Consequently, it is advantageous to have a self-contained, compact, thin negative transporting device, which can be easily mounted to and removed from the enlarger. In some enlargers the upper surface which forms the space into which the negative holder is placed is the bottom surface of a movable structure which supports the condensers, and this surface actually sits on the carrier. In such enlargers it is therefore necessary to lift the condensing system to relieve the pressure from the negative carrier before the film can be shifted.

Because of these difficulties, those skilled in the art have attempted to devise various methods for solving these problems. For example, hinged film holders having glass plates between which the film is sandwiched have frequently been used, particularly to hold strips of film and individual frames. However, the placing of the film accurately on such a carrier is difficult because the film tends to move as you close the carrier. This type of holder also does not permit the movement of the film once the carrier has been inserted into the enlarger.

Another system that has been devised (for the handling of films having perforations) is the use of carriers incorporating sprockets. However, these have the disadvantage that the opening in the enlarger required to accommodate such a carrier must be greater than the diameter of the sprocket, or conversely, the sprockets must be exterior to the surfaces forming the negative stage, which means that the carrier is not capable of handling strips shorter than the distance between the sprockets. Otherwise, the strip becomes lost between the two sprockets. Such a carrier, of course, is not capable of handling individual frames.

On the other hand, even if the sprockets were moved very close to the aperture (and the resulting thickness of the gap were tolerated), a single frame on a small strip could not be fed into the enlarger, since the negative stage in many enlargers is too wide to permit the insertion of a small film far enough into the enlarger for it to be picked up by the sprockets.

Further objections to mechanisms involving sprockets are the cost of manufacture, tendency to damage film by tearing the film sprocket holes, and requirement for careful manipulation of the film to insure proper engagement by the sprockets.

Other carriers have been made in which the film is advanced by means of friction rollers in which the axis of the roller is parallel to the plane of the carrier and perpendicular to the direction of the motion of the film. In this type of carrier the film is carried by the friction of the roller on one surface of the film, but the frictional contact is not very large, and a series of driven rollers is needed to handle individual frames or small pieces of film. Furthermore, in these types of carriers, unless glass plates are provided (which must be separated from the film during the transporting operation), no contribution is made by the transporting system toward keeping the film flat.

The disadvantages of these prior art film carriers have been avoided in the apparatus disclosed in this application in which a film supported on a pair of aligning film guides is transported by means of an endless belt providing a long, point to point frictional driving contact with the film. The arrangement of the belt is such that the portion of the belt at each end of the film guide slopes away from the film guide to provide a funneling entrance to facilitate insertion of the film at either end of the carrier. The sloping engagement of the film by the carrier obviates the tedious manipulation of the film to insure proper alignment with the carrier. Consequently, there is less chance that the film will be smudged, scratched, or otherwise damaged by the operator's handling of the film.

The carrier is such that the cooperation of the aligned film guides with the belt on one side and with a third guiding member on the other accomplishes a flattening of the film, overcoming the tendency of the film to be bowed out of the plane of projection. The carrier also incorporates a movable aperture masking plate for changing the area of the film which is projected, and also contains a window designed to permit the projection of a fiducial mark or frame number for identification of particular film frames.

An object of the invention is to provide a film carrier which continuously conveys a length of film in either longitudinal direction in the carrier and positions that film in the carrier such that any specifically identified area or numbered frame (to either extremity of the film strip) can be aligned precisely with an aperture in the film carrier.

Another object is to provide a film carrier having a means of flattening (in the format or frame being projected) the transverse bow caused by the film's emulsion, without any part of the film carrier touching that lengthwise area along the film occupied by the succession of frames.

Another object is to provide a holder through which any length of film, from a single frame piece to the maximum strip length commonly used, may be conveyed in either direction even though the film be unperforated and without clamping or unclamping or opening any parts of the film carrier which carrier is a compact, relatively permanent, self-contained assembly requiring no interruption for successive different functions.

These advantages and objects as well as other such advantages and objects of this invention not at this time more particularly enumerated will be apparent from the accompanying description and drawings wherein:

FIG. 4 is a partial sectional view of the apparatus taken along section lines 4—4 of FIG. 1;

FIG. 5 is a partial sectional view of the apparatus taken along section lines 5—5 of FIG. 1;

FIG. 6 is a partial sectional view of the apparatus taken along sectional lines 6—6 of FIG. 1;

Figure 1:
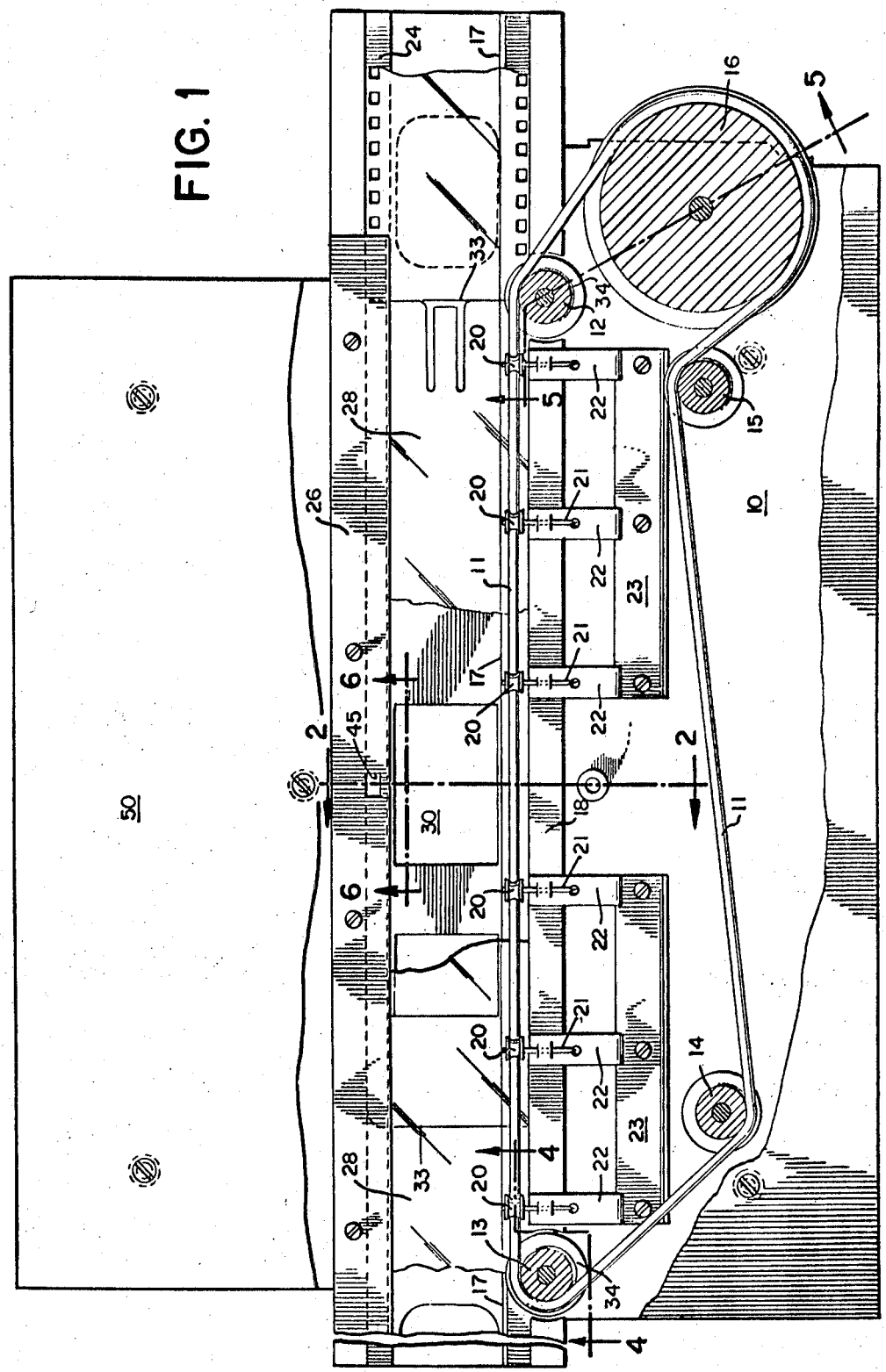
FIG. 1 is a plan view in partial section of an apparatus made in accordance with my invention.
Figure 2:
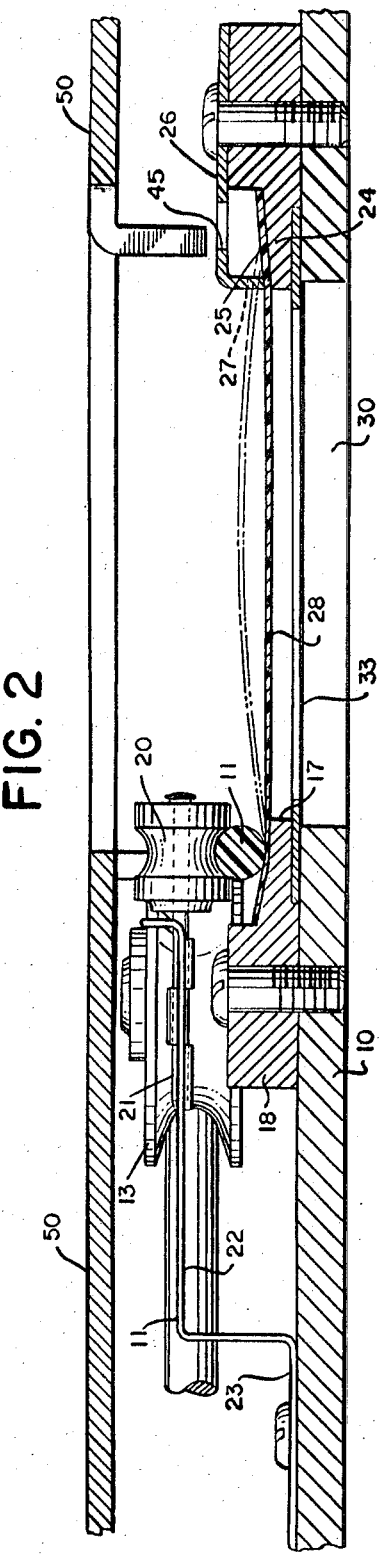
FIG. 2 is a sectional elevational view of the same apparatus taken along section lines 2—2 of FIG. 1.
Figure 3:
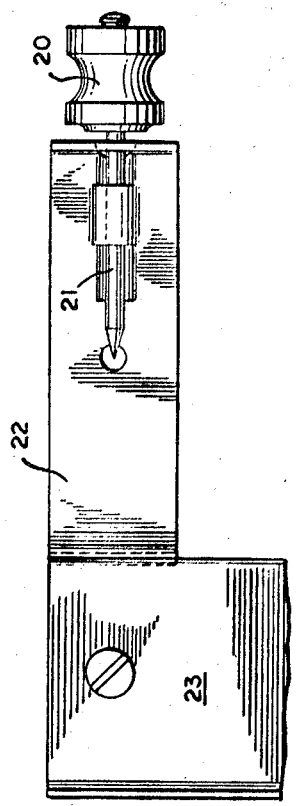
FIG. 3 is a bottom partial view of the roller arm element of the apparatus of FIG. 1.

As shown in FIGS. 1 and 2, base plate 10 supports a belt 11 which is engaged and guided around idler pulleys 12, 13, 14 and 15 and drive pulley 16 all of which are freely journalled on base plate 10. Belt 11 is preferably circular in cross-section and made of a frictional semi-resilient plastic material. Belt 11 engages and presses one edge of film 28 against step 17 of film track 18. Step 17 is preferably coated with a low friction plastic such as a fluorocarbon (not shown) so as to facilitate slippage of film 28 across its face. Belt 11 is pressed in non-sliding, point to point contact with the edge of film 28 by a series of rollers typically 20 which are freely journalled on pins 21 in spring arms 22 which coextend from a main channel shaped body 23 secured to base plate 10. An enlarged top view of a roller 20, pin 21 and spring arm 22 is illustrated in FIGURE 3. Rollers 20 preferably have semi-circular surfaces to firmly engage belt 11.

Positionally cooperating with belt 11 and inclined step 17 of film track 18 is a second film track 24 for guiding the other edge of film 28 and for flattening the film adjacent aperture 30. Film track 24 is also provided with an inclined step 25 which supports the edge of film 28 opposite the edge held by belt 11 and inclined step 17. Positioned over step 25 is a film retainer guide 26 which thereby forms a gap through which film 28 passes. Retainer guide 26 is provided with a downwardly disposed edge member 27, only a portion of which is extended still further adjacent aperture 30 to contact film 28 at aperture 30. In this way edge member 27 presses film 28 downwardly adjacent aperture 30 so as to flatten film 28 at the aperture, thus removing the natural bow of the film (shown in dashed lines). This flattening is effected by the reverse bending of the film 28 at its opposite edges by belt 11 against step 17 and by edge member 27. Edge member 27 need not press film 28 against step 24; it need only press film 28 sufficiently downwardly from the upper edge of film 28 which is supported by the upper edge of step 24, so as to reverse the natural bend of film 28 and thereby flatten it, as shown in FIGURE 2. Edge member 27 contacts only the edge of film 28, thus avoiding damage to the image bearing portion of film 28, and edge member 27 contacts film 28 only adjacent aperture 30, thus limiting direct contact of edge member 27 with film 28 to where film flattening is required, i.e., at aperture 30. Retainer guide 26 does not contact film 28 except where its edge member 27 flattens the film at aperture 30. Thus where film 28 is not engaged by edge member 27, it passes vitually friction-free across step 25, the edge of film 28 riding quite freely on top of step 25.

Summarizing the above, one edge of film 28 is driven on step 17 by friction belt 11 under the pressure of spring biassed rollers 20. Transverse flattening or straightening of film 28 is achieved on the opposite edge edjacent aperture 30 by contact with film guide edge member 27 on the upper surface of film 28. Step 17 is on the same level as step 25, and it has substantially the same slope, except in the opposite direction. Edge member 27 is approximately one film thickness above the level of contact of film 28 with steps 17 and 25, so as to flatten film 28 at aperture 30.

The undersides of step 17 and step 25 in conjunction with the top surface of base plate 10, cooperate to form a slide-way for aperture masking plate 33 which frames aperture 30 of base plate 10. Apertures of several longitudinal sizes may be disposed in masking plate 33, which is optionally positionable around the projection optical center of base plate 10, in order to accommodate full, half, or other sized transparency frames. Accurate positioning of masking plate 33 in its different positions relative to base plate 10 may be achieved by means of a suitably positioned lug (not shown) on plate 33 which engages a corresponding opening (not shown) in base plate 10.

As indicated in FIG. 1, belt 11 is driven in the respective grooves of idler pulleys 12, 13, 14 and 15 by drive pulley 16. The grooves of these pulleys are aligned along a common center line 35 (FIG. 4 and FIG. 5). In order for film 28 to clear the lower flange 34 of idler pulleys 12 and 13, the conveyor belt 11 is displaced downwardly by rollers 20 from common center line 35 to center line 36. The entry and exit throats (see FIGS. 4 and 5) thus created by the slope of belt 11 and the plane of film 28 on tracks 18 and 24 provide for easy insertion of film 28 at either end of the film holder and for smooth, gradual, scratch-free engagement and disengagement of film 28 and belt 11.

Details of the belt driving means are shown in FIG. 5, wherein peripherally knurled drive pulley 16 is provided with an extending rigidly attached shaft 41. Bearing member 40 is affixed to base plate 10 and journals shaft 41. A knurled knob 42 is attached to the shaft 41 for fast manual actuation, while the knurled periphery of large drive pulley 16 is for slow or vernier manual actuation. Pin 43 projecting from knob 42 in conjunction with groove 44 on the extension of shaft 41, provides a means of coupling a flexible drive shaft or a reversible electric drive motor (not shown) for remote actuation.

A second smaller aperture 45 is provided in base plate 10, film guide 26, masking plate 33, and cover plate 50 as shown in FIG. 1. Aperture 45 permits the projection of the film frame number along with the image on the film through main aperture 30. These frame numbers are located adjacent the edge of the film. A slidable blocking plate (not shown) may also be provided to block out aperture 45 when it is not needed.

Cups (not shown) may also be provided for accommodating the curled-up ends of long films being handled by this apparatus. These cups can be attached to each end of base plate 10. They may be made in two hinged, spring-held sections so that their effective diameter can increase with the amount of film held by them. Otherwise the resistance encountered by the film entering the cups may be too high for the friction drive of belt 11.

Figure 7:
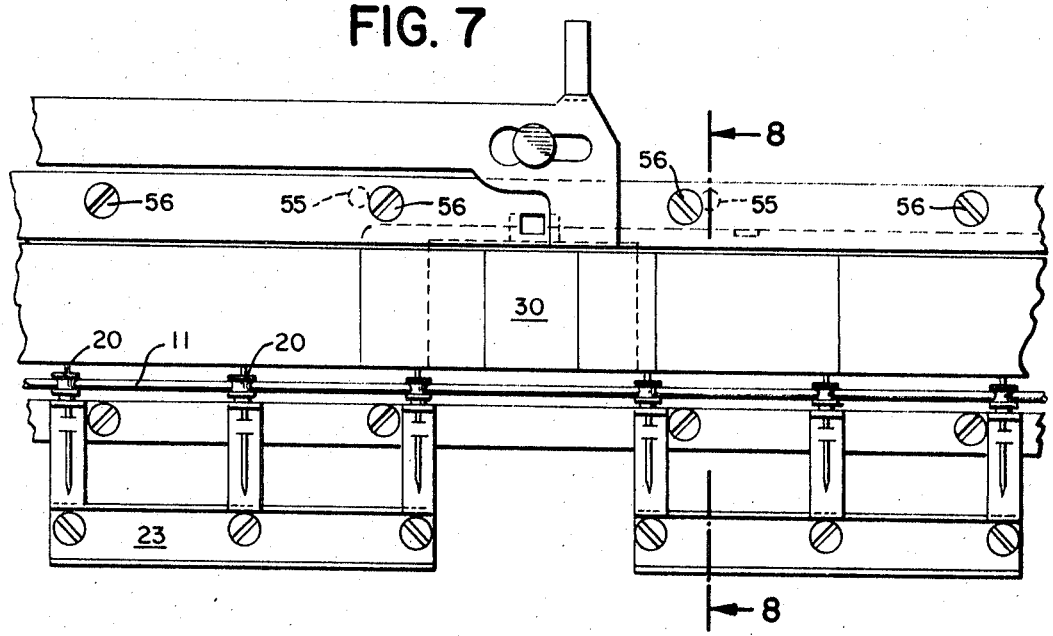
FIG. 7 is a partial plan view of a modified form of the apparatus shown in FIG. 1.
Figure 8:
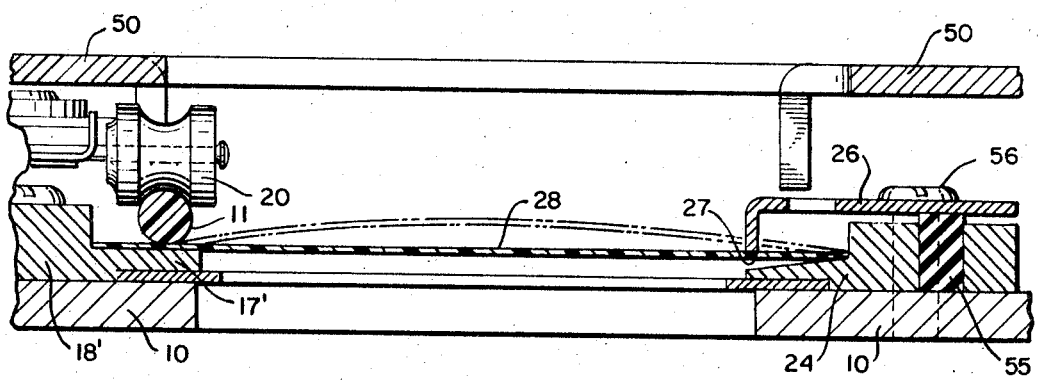
FIG. 8 is an enlarged sectional elevational view of the apparatus of FIG. 7 taken along section lines 8—8 thereof.

FIGS. 7 and 8 illustrate a modified form of this invention. The structure of this embodiment is essentially the same as that described above except for certain differences which will now be described. Those features which have already been described above will be referred to by the reference numerals employed above. Where reference is made to a modified element, a primed reference numeral will be used.

Referring to FIG. 8, film track 18' has a level step 17' in place of the inclined step 17 shown in FIG. 2 and described above. It has been found that the use of a flat step 17' as shown in FIG. 8 results in improved flattening of the film, eliminating the slight overflattening which sometimes occurs when inclined step 17, previously described, is used.

Another variation in this modified form of the invention which is illustrated in FIGS. 7 and 8 is the use of resilient spring plugs 55. Plugs 55 are interposed between film retainer guide 26 and base plate 10, passing freely through the holes in film track 24. Spring plugs 55 are spaced adjacent each side of aperture 30 as shown in FIG. 7.

Plugs 55 function to permit close adjustment of the gap between the lower edge of the downwardly disposed member 27 of retainer guide 26 and the upper surface of film track 24, thus permitting precise control of the positioning of edge member 27 on film 28 in relation to the position of the edge of film 28 resting against track 24. This position is controlled by tightening or loosening screws 56 which releasably connect retainer guide 26 to base plate 10.

It will be apparent that by turning screws 56 clockwise, guide 26 will be forced against the resilient pressure of plugs 55 into closer adjacency with base plate 10 and thus with film track 24. This will cause member 27 of guide 26 to move downward to force the upward curving portion of the film into the plane of the film 28 controlled by track 24. Vice versa, if screws 56 are turned counter-clockwise, member 27 will be raised by spring plugs 55.

Similarly, adjustment is provided along the length of the aperture 30. For example, if screw 56 immediately adjacent the right side of aperture 30 is turned clockwise, and if screw 56 which is immediately adjacent the left side of aperture 30 is turned counter-clockwise, this will tilt the lower edge of member 27 a corresponding degree as desired by the operator. Thus if the lower edge of member 27 becomes canted relative to the film track 24, its angular displacement can be corrected by relative adjustment of screws 56 on either side of aperture 30.

This adjustability is important to the apparatus. It avoids a requirement for ultra-precise tolerances in the manufacture of the apparatus, thus reducing costs of manufacture, while providing an apparatus which can be easily adjusted to obtain optimum precision in the positioning of the film 28 in the gap between member 27 and film track 24. This adjustability also permits the operator to correct for misalignment which may occur from normal usage of the apparatus or from accidental mishandling. It also permits the operator to adjust the apparatus to accommodate different film thicknesses.

While particular embodiments and uses of this invention have been described above, it is to be understood that other embodiments and uses and modifications and variations thereto are possible without departing from the principles of the invention. For example, this invention can be used with slide and movie projectors, as well as with photo-enlarging apparatus. Accordingly, the scope of this invention should be limited only by the scope and proper interpretation of the claims appended hereto, and not by the description of the specific embodiment herein.

What is claimed is:
1. A film positioning apparatus comprising:
 (a) stationary carrier means for guiding one edge of a moving piece of film on a given path to and past an aperture through which the image on the film may be projected,
 (b) a frictional belt,
 (c) means for resiliently urging said belt against the edge of the film on said carrier means adjacent said aperture and parallel to said path, said belt being adapted to firmly hold and move in non-sliding point to point contact with the film on the carrier means, and
 (d) belt driving means for moving the belt and thereby the film to and past the aperture.

2. A film positioning apparatus as claimed in claim 1 further comprising a second stationary carrier means coplanar with the first such means, said second stationary carrier means being positioned and adapted to engage the edge of the film opposite the edge engaged by said first carrier means, and film flattening means positioned adjacent said second stationary carrier means and adapted to engage the film outside its image bearing portion near the edge engaged by such second means, said flattening means having a member for pressing the film flat between the first and second stationary carrier means at the aperture against the film's natural bending tendency.

3. A film positioning apparatus as claimed in claim 2 wherein said carrier means comprise:
 (a) first film track means having a low friction surface positioned to support and guide one edge of said film, said surface being aligned with the frictional belt and adapted to support the film against the pressure of the belt,
 (b) second film track means parallel to the first and positioned to support and guide the opposite edge of said film,
 (c) said second film track means including an upper guide having a downwardly extending member, and a lower downwardly inclined step, said member and step forming a gap through which the film edge may pass, said downwardly extending member terminating approximately one film thickness above the height of said first film track means at a location spaced inwardly from the outer edge of film passing through such gap whereby said downwardly extended member in conjunction with the first film track and the inclined step flattens the film as it passes through the carrier means.

4. A film positioning apparatus as claimed in claim 3 wherein said frictional belt is resilient and circular in cross-section and wherein said means for resiliently urging said belt against said carrier means comprises a plurality of rollers having semicircular driving surfaces of substantially the same diameter as said belt.

5. A film positioning apparatus as claimed in claim 3 wherein said second film track means further comprises means for adjusting the position of said downwardly extending member relative to said step.

6. A film positioning apparatus as claimed in claim 1 wherein said means for resiliently urging said belt against the film includes means for tracking the belt into gradual sloping engagement and disengagement with film held and moved by the belt against the carrier means.

7. A film positioning apparatus comprising:
 (a) a stationary base plate having an aperture through which an image from a frame of film can be projected,
 (b) a pair of film tracks mounted on said base plate and positioned to engage the opposite edges of said film and thereby guide it to and past said aperture, (c) an endless semi-resilient frictional belt, (d) means for resiliently urging said belt against one edge of said film on the first of said film tracks to engage and firmly hold in continuous contact a length of film between the belt and the corresponding first film track adjacent said aperture, the length of such contact being greater than the length of said aperture measured in the same direction as the line of contact, and (e) belt driving means for moving the belt and thereby the film to and past the aperture in the base plate.

8. A film positioning apparatus as claimed in claim 7 wherein said means for resiliently urging said belt against said film comprises a plurality of rollers spring mounted on said base plate, said rollers being individually mounted and positioned relative to the first of said film tracks so as to exert a uniform pressure by the belt on the film throughout its length of contact therewith.

9. A film positioning apparatus as claimed in claim 7 wherein the second of said film tracks is sloped downwardly toward the first of said tracks and on substantially the same level relative thereto, said second track comprising:

(a) an upper film surface guide adjacent the base plate aperture, said upper guide and second film track forming a gap adjacent the base plate aperture through which the film edge may pass, (b) said upper film surface guide being positioned and adapted to contact the upper surface of the film passing between the said film tracks, thereby flattening the film when it is positioned at the aperture.

10. A film positioning apparatus as claimed in claim 9 wherein said second film track further comprises means for adjusting the position of said upper film surface guide relative to said second film track.

11. A film positioning apparatus as claimed in claim 10 further comprising an aperture masking plate, and means for slidably mounting said plate to the base plate alternately in and out of registry with the aperture in the base plate, said masking plate having at least one aperture which is smaller than the aperture of the base plate, whereby said masking plate aperture can be repositioned in or out of registry with said base plate aperture to change the effective size of such base plate aperture.

12. A film positioning apparatus as claimed in claim 11 wherein said base plate and second film track have a second smaller aperture positioned relative to the film tracks and base plate main aperture so as to project film frame identification matter when the image on said film is projected through the first aperture.

References Cited

UNITED STATES PATENTS 2,408,310  9/1946  Hassler ------------ 95—76 X

JOHN M. HORAN, Primary Examiner

U.S. Cl. X.R.

226—74, 117; 352—183; 355—99, 111